United States Patent
Kawahara

(10) Patent No.: US 6,734,902 B1
(45) Date of Patent: May 11, 2004

(54) VIBRATION CORRECTING DEVICE

(75) Inventor: Hideo Kawahara, Hatogaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/207,918

(22) Filed: Dec. 9, 1998

(30) Foreign Application Priority Data

Dec. 12, 1997 (JP) ............................................. 9-342755

(51) Int. Cl.[7] .................... H04N 5/228; G03B 17/00
(52) U.S. Cl. ............................. 348/208.8; 348/208.5; 396/55
(58) Field of Search ................... 348/208.5, 208.2, 348/208.3, 208.11, 208.12, 208.14, 208.16, 240.3, 360; 396/52, 53, 55

(56) References Cited

U.S. PATENT DOCUMENTS

| | | | | |
|---|---|---|---|---|
| 5,282,044 A | * | 1/1994 | Misawa et al. | 348/208.5 |
| 5,337,098 A | * | 8/1994 | Imafuji et al. | 396/55 |
| 5,585,875 A | * | 12/1996 | Imafuji et al. | 396/55 |
| 5,867,213 A | * | 2/1999 | Ouchi | 348/208.5 |
| 5,982,421 A | * | 11/1999 | Inou et al. | 348/208.5 |
| 6,035,134 A | * | 3/2000 | Sato et al. | 396/55 |
| 6,046,768 A | * | 4/2000 | Kaneda et al. | 348/208.2 |
| 6,501,503 B2 | * | 12/2002 | Kudo | 348/208.99 |
| 2002/0051635 A1 | * | 5/2002 | Morofuji | 396/55 |
| 2002/0054213 A1 | * | 5/2002 | Kawahara et al. | 348/208 |
| 2003/0035053 A1 | * | 2/2003 | Kyuma et al. | 348/208.2 |

FOREIGN PATENT DOCUMENTS

| | | | | |
|---|---|---|---|---|
| JP | 08029823 A | * | 2/1996 | G03B/5/00 |
| JP | 08251473 A | * | 9/1996 | H04N/5/232 |
| JP | 09068734 A | * | 3/1997 | G03B/5/00 |
| JP | 09130748 A | * | 5/1997 | H04N/5/92 |
| JP | 09322057 A | * | 12/1997 | H04N/5/235 |

\* cited by examiner

*Primary Examiner*—Wendy R. Garber
*Assistant Examiner*—John M Villecco
(74) *Attorney, Agent, or Firm*—Fitzpatrick, Cella, Harper & Scinto

(57) ABSTRACT

A vibration correcting device comprises first vibration correcting amount output unit for obtaining and outputting a vibration correcting amount from the amount of vibration of the apparatus, second vibration correcting amount output unit for obtaining and outputting a vibration correcting amount from the amount of vibration in a picked-up image obtained by picking up an object image with image pickup unit through an optical system, correction unit for correcting the vibration in the picked-up image based on the output of the first and second vibration correcting amount output unit, and control unit for controlling the outputs of the first and second vibration correcting amount output unit based on the outputs thereof.

17 Claims, 12 Drawing Sheets

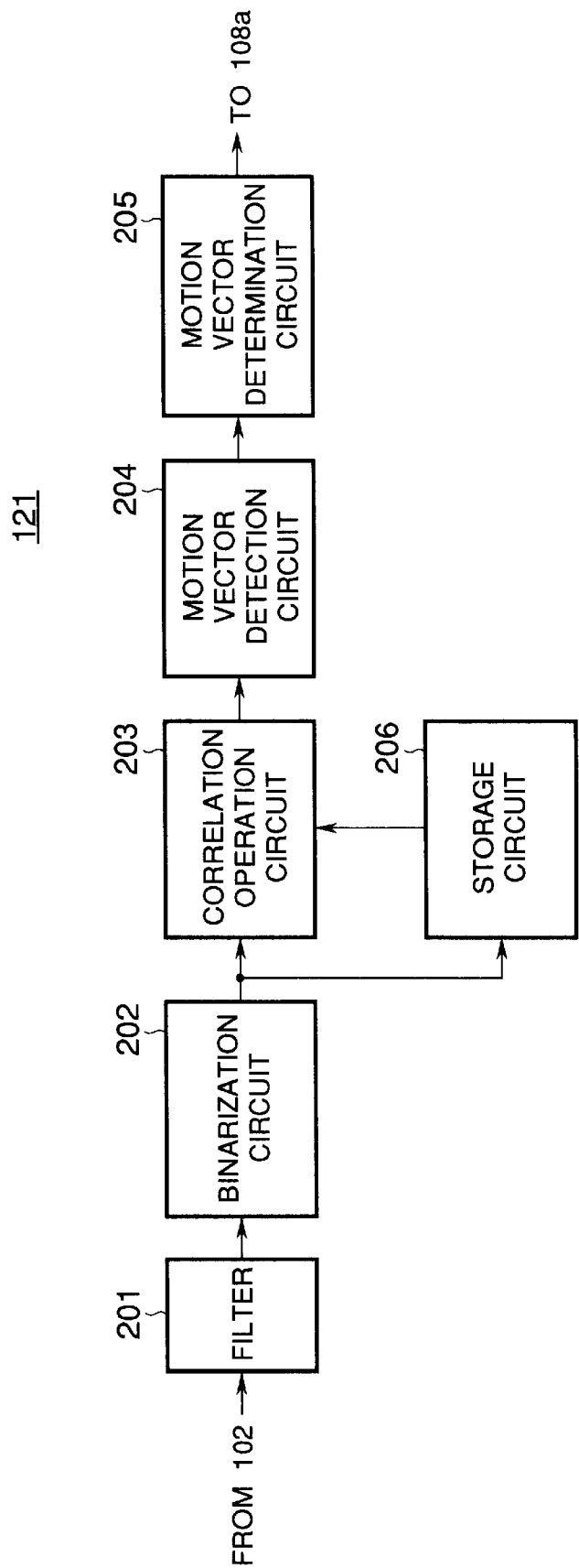

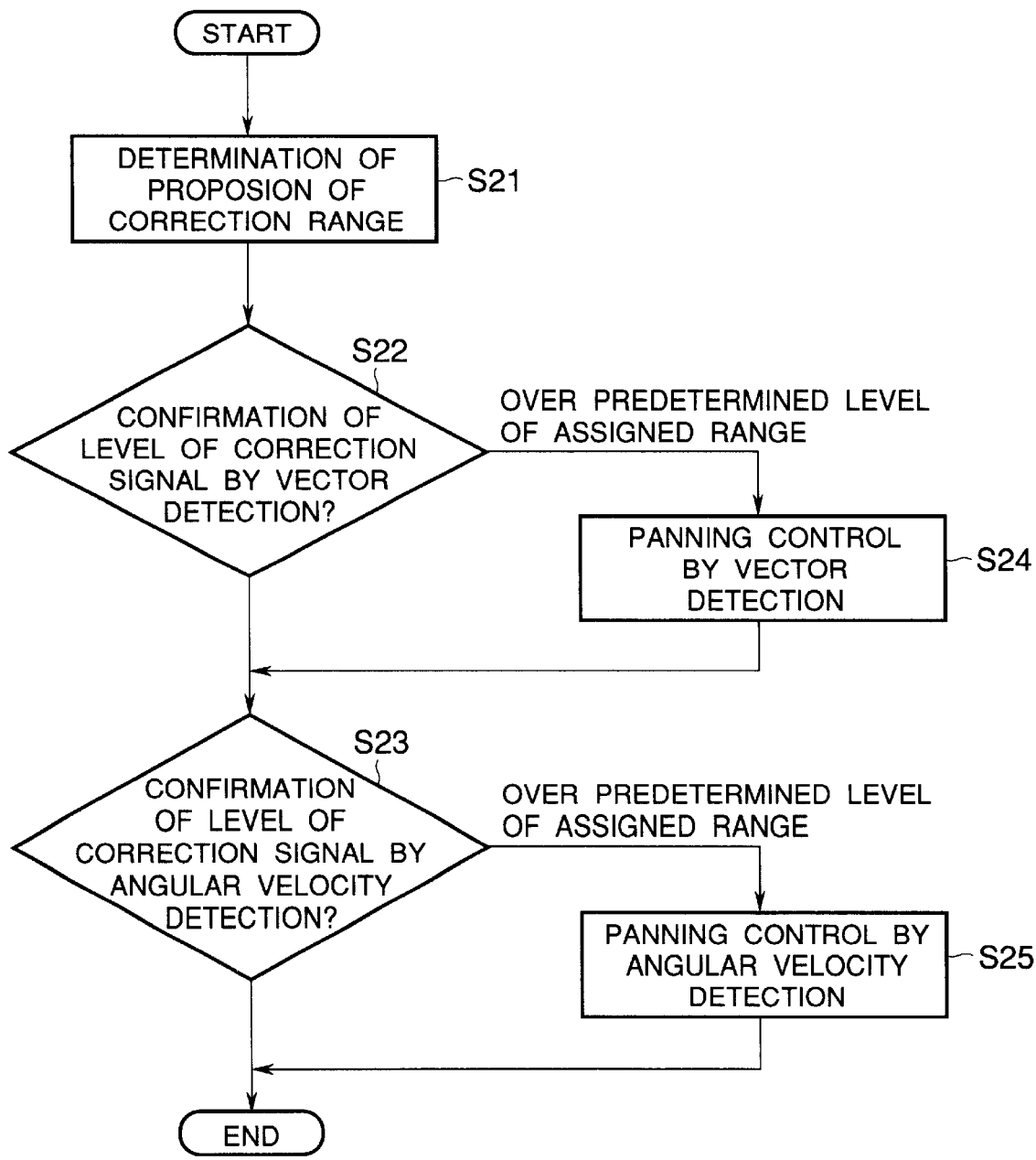

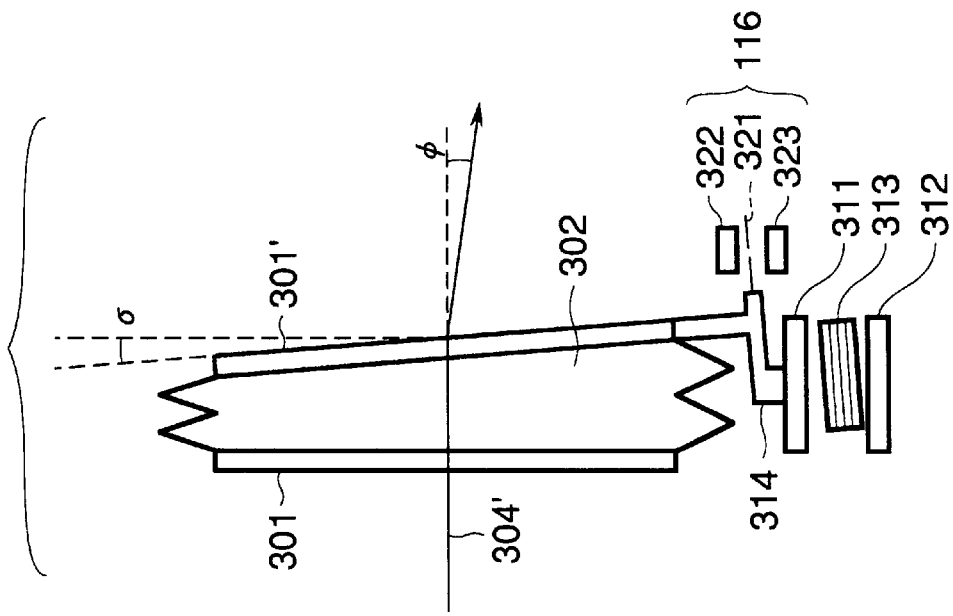
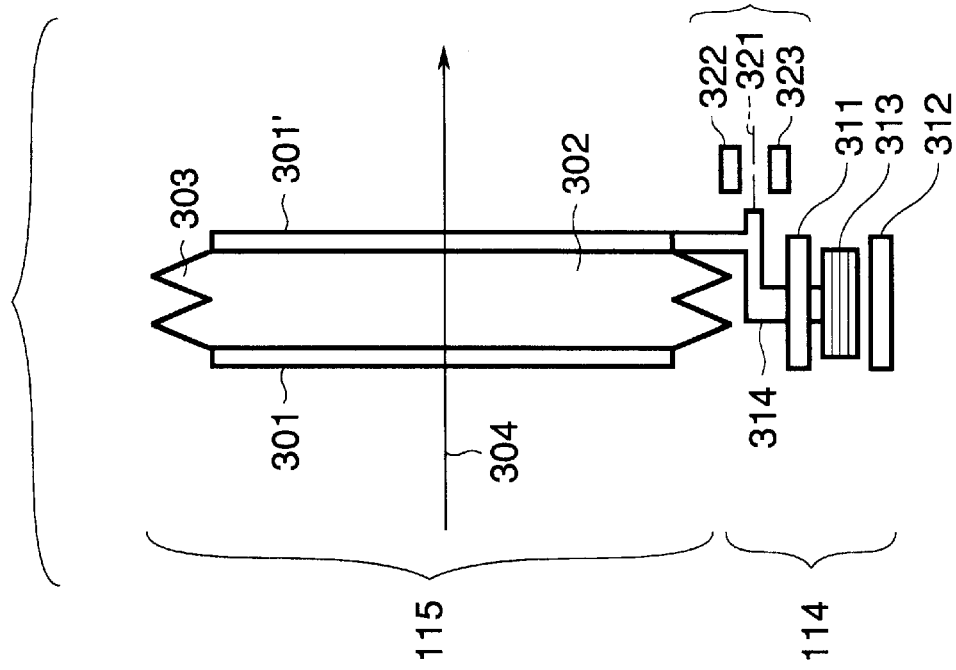

VIBRATION CORRECTING DEVICE

BACKGROUND OF THE INVENTION

1. Field of the Invention

The present invention relates to a vibration correcting device for optically correcting vibration generated in a picked-up image for example by hand shaking, and an image pickup device, an image pickup system, a camera unit and a lens unit provided with such vibration correcting device.

2. Related Background Art

In an image pickup apparatus such as a video camera, automation and multiplication are made in all the functions such as by auto exposure (AE) or auto focusing (AF) in order to enable satisfactory image pickup operation in an easy manner.

Also in consideration of a fact that, with the compactization of the image pickup apparatus and with the increase in the magnification of the optical system, the vibration of the apparatus is a major factor deteriorating the quality of the picked-up image, there have recently been proposed various vibration correcting functions for correcting the vibration generated in the picked-up image by the vibration of such apparatus (namely vibration in the supporting hand). A further satisfactory image pickup operation can be easily achieved by providing the image pickup apparatus with such vibration correcting function.

As the vibration correcting function adapted for use in an image pickup apparatus for obtaining a picked-up image by focusing the light from the object on the image pickup face of an image pickup element, there is known a configuration as shown in FIG. 11.

In such vibration correcting function 600, an angular velocity detection sensor 601 is composed of an angular velocity sensor such as a vibration gyro, and, being mounted on the main body of the image pickup apparatus, detects the vibration thereof as an angular velocity.

A DC cut-off filter 602 cuts off the DC component of an angular velocity signal outputted from the angular velocity detection sensor 601 and only transmits the AC component, that is, the vibration component.

An amplifier 603 amplifies the angular velocity signal from the DC cut-off filter 602 to an appropriate sensitivity level.

An analog/digital (A/D) converter 604 digitizes the angular velocity signal outputted from the amplifier 603.

A high-pass filter (HPF) 605, an integrator 606 and a pan/tilt discrimination circuit 607 are composed for example of a microcomputer COM.

The high-pass filter 605 can variably change characteristics thereof with an arbitrary frequency range, and outputs the digital angular velocity signal (angular velocity data) from the A/D converter 604 after cutting off the low frequency component contained therein.

The integrator 606 can variably change characteristics thereof with an arbitrary frequency range, and, integrating the angular velocity data from the high-pass filter 605, outputs the result of integration as angular displacement data.

The pan/tilt discrimination circuit 607 executes panning control by discriminating panning/tilting based on the angular velocity data from the A/D converter 604 and the angular displacement data from the integrator 606.

More specifically, if the angular velocity data is at least equal to a predetermined threshold value, or if it is less than the predetermined threshold value but the angular displacement data (result of integration) is at least equal to a predetermined threshold value, a panning or tilting state is identified and the panning control is executed. In such panning control, the low range cut-off frequency of the high-pass filter 605 is shifted to a higher frequency, whereby a vibration correcting system in an image correction device 610 does not respond to lower frequencies. Also the time constant employed in the integrating operation of the integrator 605 is shifted to a shorter time, whereby the vibration correcting position of the image correcting circuit 610 is gradually shifted toward the center of a movable range and the angular displacement data outputted from the integrator 606 gradually approached a reference value (a value to be assumed in the absence of vibration).

In other situations, the panning or tilting is identified to have been completed, and the low range cut-off frequency of the high-pass filter 605 is shifted to a lower frequency and the time constant employed in the integrating operation of the integrator 606 is shifted to a longer time. Thus the low range cut-off frequency of the high-pass filter 605 and the time constant employed in the integrating operation of the integrator 606 are returned to the original state, and the panning control is terminated.

A digital/analog (D/A) converter 608 converts the angular displacement data from the integrator 606 into an analog value.

A driving circuit 609 drives the image correction device 610 based on the analog angular displacement data outputted from the D/A converter 608.

The image correction device 610 is provided with an optical vibration correcting unit employing, for example a variable angle prism, and varies the vertical angle of the variable angle prism according to the drive by the drive circuit 609, thereby optically correcting the vibration generated in the picked-up image.

As explained in the foregoing, the vibration correcting function 600 is adapted to detect the vibration in the apparatus by the angular velocity detection sensor 601 employing for example the vibration gyro, and to optically correct the vibration in the picked-up image based on the result of such detection.

However, the conventional vibration correcting functions such as that 600 have been associated with the following drawbacks:

(1) In a configuration for correcting the vibration in the picked-up image, utilizing the output signal of the vibration gyro or the like detecting the angular velocity, the error in the correction of the picked-up image increases with an increase in the magnification of the image pickup lens, namely when the image pickup lens is operated at a telephoto side.

The error in the correction of the picked-up image indicates insufficient or excessive correction in the vibration correction system with respect to the vibration amount in the main body of the apparatus. The amount of correction error on the image pickup plane increases with an increase in the focal length of the optical system of the image pickup apparatus, which results in an increase in the image magnification.

(2) On the other hand, there is proposed a video camera with an interchangeable lens system similar to the conventional still camera, in order to widen the image pickup applications of the video camera.

In such a video camera, the interchangeable lens system allows one to easily attach a lens of high magnification, since such a high-magnification lens or an extender can be detachably mounted.

Consequently, the above-described correction error becomes larger in the image pickup apparatus of the interchangeable lens system such as the video camera, in comparison with the image pickup apparatus with the fixed lens.

(3) In particular, in the angular velocity detecting sensor utilizing the vibration gyro, the detection characteristics thereof deteriorate in a low frequency region less than 1 Hz. Consequently, in such low frequency region, the above-described correction error increases evidently, showing an insufficient correction in the low frequency region and leading to deterioration of the image quality.

In order to solve these drawbacks, there is proposed a vibration correcting function with improved correcting performance, by providing a circuit for detecting the remnant or insufficient vibration in the picked-up image, in addition to the angular velocity detection sensor employing for example the vibration gyro.

For example, as shown in FIG. 12, such vibration correction function 700 is provided, in addition to the components 601–610 of the vibration correction function 600 shown in FIG. 11, with a camera signal processing circuit 701 for generating a video signal for example of the NTSC format from the image information obtained from the image pickup element of the image pickup apparatus, a motion vector detection circuit 702 for detecting a motion vector of the image based on the luminance signal contained in the image signal generated in the camera signal processing circuit 701, and a high-pass filter 605', an integrator 606' and a pan/tilt discrimination circuit 607' for converting the motion vector detected by the motion vector detection circuit 702 into a displacement amount (displacement data).

The high-pass filter 605', the integrator 606' and the pan/tilt discrimination circuit 607' are composed of a microcomputer COM', like the aforementioned microcomputer COM, and thereby the panning/tilting is discriminated and the panning control is executed based on the motion vector outputted from the motion vector detection circuit 702 and the displacement data of the motion vector outputted from the integrator 606'.

The vibration correcting function 700 is further provided with an adder 703 for adding the angular displacement data outputted from the integrator 606 of the microcomputer COM and the displacement data of the motion vector outputted from the integrator 606' of the microcomputer COM', and the result of addition in the adder 703 is supplied to a D/A converter 608.

In the above-described configuration, therefore, the displacement amount of the motion vector of the picked-up image, namely the remnant vibration therein, is added to the angular displacement amount as auxiliary information thereof, and the vibration in the picked-up image is optically corrected. As a result, the correction of vibration can be achieved with higher accuracy.

However, such conventional vibration correcting function has still been associated with the following drawbacks.

The angular velocity data obtained from the output of the angular velocity detection sensor 601 and the motion vector obtained from the motion vector detection circuit 702 are related in a complex manner with the panning control in the microcomputers COM, COM', and sufficient correction of vibration may not be achieved in certain cases.

As a specific example, in case the output of the integrator 606 of the angular velocity detection sensor 601 increases alone, the panning control is executed even when the output of the integrator 606' of the motion vector detection circuit 702 is close to "0", and the correction of vibration by the output of the motion vector detection circuit 702 is not executed. Similarly, in case the output of the integrator 606' of the motion vector detection circuit 702 increases alone, the correction of vibration by the output of the angular velocity detection sensor 601 is not executed.

In particular, as the vibration in the picked-up image is corrected according to the angular displacement information (vibration information) obtained from the output of the angular velocity detection sensor 601 utilizing the vibration gyro and the displacement amount (vibration information) of the motion vector obtained from the output of the motion vector detection circuit 702, the correction by the motion vector detection circuit 702 has a larger weight in the low frequency region of 1 Hz or less where the detection characteristics of the vibration gyro become inferior. Consequently, in such configuration, the panning control is executed with emphasis on either of the angular velocity detection sensor 601 and the motion vector detection circuit 702, whereby the correcting function becomes deteriorated.

SUMMARY OF THE INVENTION

In consideration of the foregoing, an object of the present invention is to provide a vibration correcting device capable of effecting smooth control for correcting the vibration in the picked-up image with a simple configuration, thereby achieving improvement in the correcting performance.

Another object of the present invention is to provide an image pickup apparatus, an image pickup system, a camera unit and a lens unit provided with a smooth vibration correcting function of high performance.

The above-mentioned objects can be attained, according to a preferred embodiment of the present invention, by providing a vibration correcting device comprising first vibration correcting amount output means for obtaining and outputting a vibration correcting amount from the amount of vibration of the apparatus, second vibration correcting amount output means for obtaining and outputting a vibration correcting amount from the amount of vibration in a picked-up image obtained by picking up an object image with image pickup means through an optical system, correction means for correcting the vibration in the picked-up image based on the output of the first and second vibration correcting amount output means, and control means for controlling the outputs of the first and second vibration correcting amount output means based on the outputs thereof.

According to another preferred embodiment of the present invention, there are provided an image pickup apparatus, a camera, a lens unit and an image pickup system capable of optimum correction of vibration with vibration correcting means of different systems.

Still other objects of the present invention, and the features thereof, will become fully apparent from the following description which is to be picked-up in conjunction with the attached drawings.

BRIEF DESCRIPTION OF THE DRAWINGS

FIG. 3 is a block diagram showing the internal configuration of a motion vector detection circuit in the above-mentioned image pickup apparatus;

FIGS. 6A and 6B are views showing the configuration of a variable angle prism in the image correction device;

DETAILED DESCRIPTION OF THE PREFERRED EMBODIMENTS

Now the present invention will be clarified in detail by embodiments thereof, with reference to the attached drawings.

Figure 1:
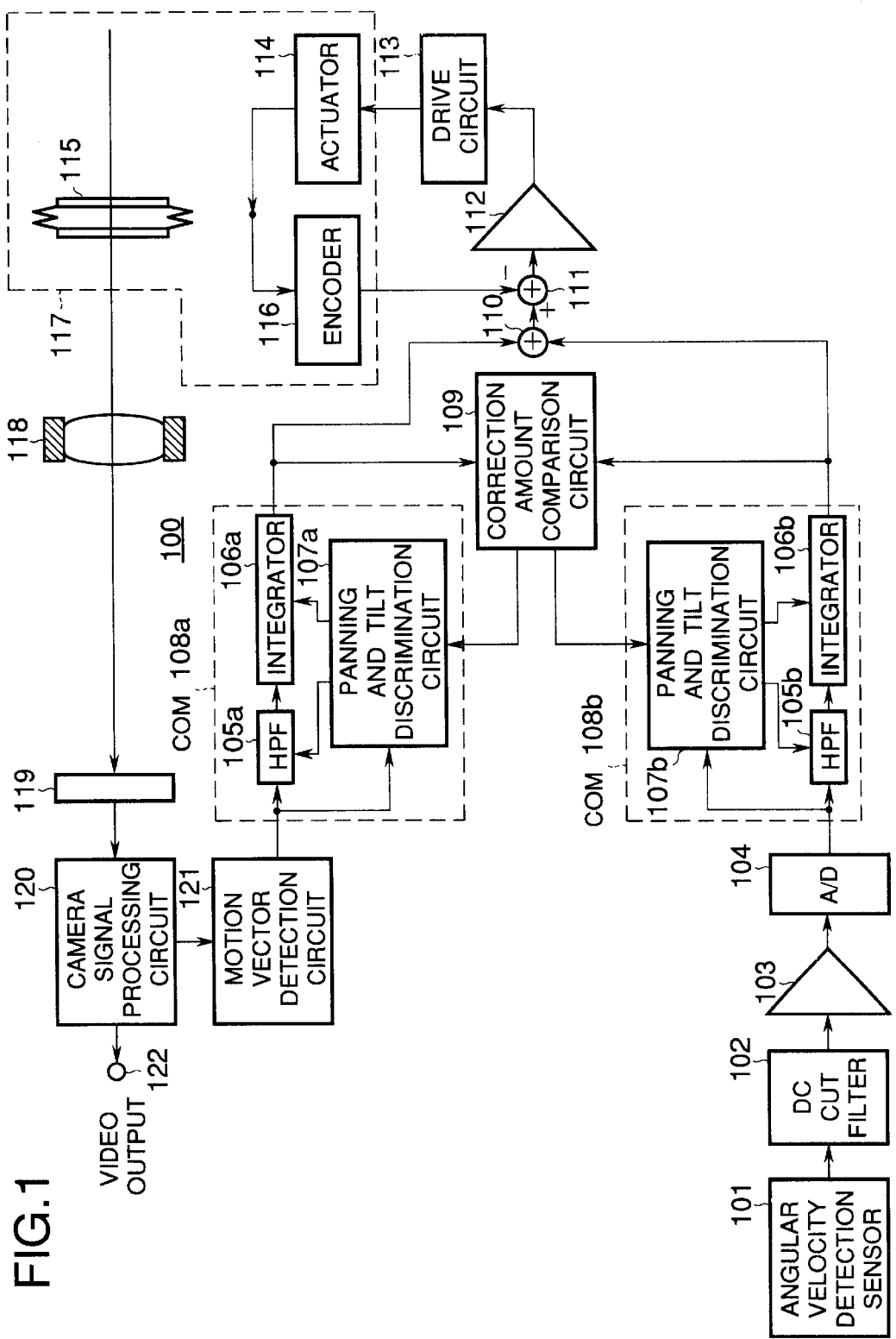
FIG. 1 is a block diagram showing the configuration of an image pickup apparatus employing a vibration correcting device of the present invention and constituting a first embodiment.

The vibration correcting device of a first embodiment of the present invention is applicable, for example, to an image pickup apparatus 100 shown in FIG. 1, which embodies the present invention.

Such image pickup apparatus 100 is most featured, in comparison with the conventional apparatus, by the presence of a correction amount comparison circuit 109 as shown in FIG. 1.

More specifically, the image pickup apparatus 100 is provided with an angular velocity detection sensor 101; a DC cut-off filter 102 receiving the output of the angular velocity detection sensor 101; an amplifier 103 receiving the output of the DC cut-off filter 102; an A/D converter 104 receiving the output of the amplifier 103; and a microcomputer (COM) 108b receiving the output of the A/D converter 104.

The apparatus 100 is further provided with a camera signal process circuit 120; a motion vector detection circuit 121 receiving the output of the camera signal processing circuit 120; and a microcomputer (COM) 108a receiving the output of the motion vector detection circuit 121.

The outputs of the microcomputers 108a, 108b are supplied to a correction amount comparison circuit 109, of which output is supplied to the microcomputers 108a, 108b.

The microcomputer 108a is provided with a high-pass filter (HPF) 105a and a pan/tilt discrimination circuit 107a, both receiving the output of the motion vector detection circuit 121, and an integrator 106a receiving the output of the high-pass filter 105a, and the output of the pan/tilt discrimination circuit 107a is supplied to the high-pass filter 105a and the integrator 106a, while the output of the correction amount comparison circuit 109 is supplied to the pan/tilt discrimination circuit 107a.

The microcomputer 108a outputs the output of the integrator 106a.

Similarly the microcomputer 108b is provided with a high-pass filter (HPF) 105b and a pan/tilt discrimination circuit 107b, both receiving the output of the A/D converter 104, and an integrator 106b receiving the output of the high-pass filter 105b, and the output of the pan/tilt discrimination circuit 107b is supplied to the high-pass filter 105b and the integrator 106b, while the output of the correction amount comparison circuit 109 is supplied to the pan/tilt discrimination circuit 107b.

The microcomputer 108b outputs the output of the integrator 106b.

The image pickup apparatus 100 is further provided with an adder 110 receiving the outputs of the microcomputers 108a, 108b; an adder 111 receiving the output of the adder 110; an amplifier 112 receiving the output of the adder 111; a drive circuit 113 receiving the output of the amplifier 112; and an image correction device 117 receiving the output of the drive circuit 113; wherein the output of the image correction device 117 is supplied to the adder 111.

The image correction device 117 is provided with an actuator 114 receiving the output of the drive circuit 113; a variable angle prism 115 receiving the output of the actuator 114; and an encoder 116 receiving the output of the variable angle prism 115, wherein the output of the encoder 116 is supplied to the adder 111.

The image pickup apparatus 100 is further provided with an image pickup optical system 118 receiving the output of the variable angle prism 115; and an image pickup element 119 receiving the output of the image pickup optical system 118; wherein the output of the image pickup elements 119 is supplied to the aforementioned camera signal process circuit 120.

The output of the camera signal process circuit 120 is supplied to the motion vector detection circuit 121 as explained in the foregoing and also to a display unit or a recording unit through a video output terminal 122.

In the following there will be given detailed explanation on the components constituting the image pickup apparatus 100.

The angular velocity detection sensor 101 includes an angular velocity sensor such as a vibration gyro, and detects the vibration of the apparatus itself, caused for example by the vibration of the supporting hand, as an angular velocity signal for supply to the DC cut-off filter 102.

The DC cut-off filter 102 cuts off the DC component contained in the angular velocity signal from the angular velocity detection sensor 101 and sends the AC component or the vibration component in the angular velocity signal to the amplifier 103.

The DC cut-off filter 102 may be composed of a high-pass filter (HPF) for cutting off the input signal in a predetermined frequency region.

The amplifier 103 amplifies the angular velocity signal (vibration component) from the DC cut-off filter 102 to an optimum sensitivity, for supply to the A/D converter 104.

The A/D converter 104 digitizes the angular velocity signal from the amplifier 103, for supply to the microcomputer 108b.

In the microcomputer 108b, the HPF 105b is capable of varying the characteristics in an arbitrary frequency region, and transmits the angular velocity data from the A/D converter 104 after cutting off the low frequency component contained therein.

The integrator 106b is capable of varying the characteristics thereof in an arbitrary frequency region, and integrates the angular velocity data from the HPF 105b and outputs the result of such integration (sum of angular displacement amount) as angular displacement data.

The pan/tilt discrimination circuit 107b discriminates a panning/tilting state and executes panning control, based on the angular velocity data from the A/D converter 104 and the angular displacement data (sum of angular displacement) from the integrator 106b, and these operations are executed according to the output of the correction amount comparison circuit 109 to be explained hereinafter.

More specifically, the pan/tilt discrimination circuit 107b executes the following panning control only when an instruction for the panning control is given from the correction amount comparison circuit 109.

Panning Control

Figure 2:
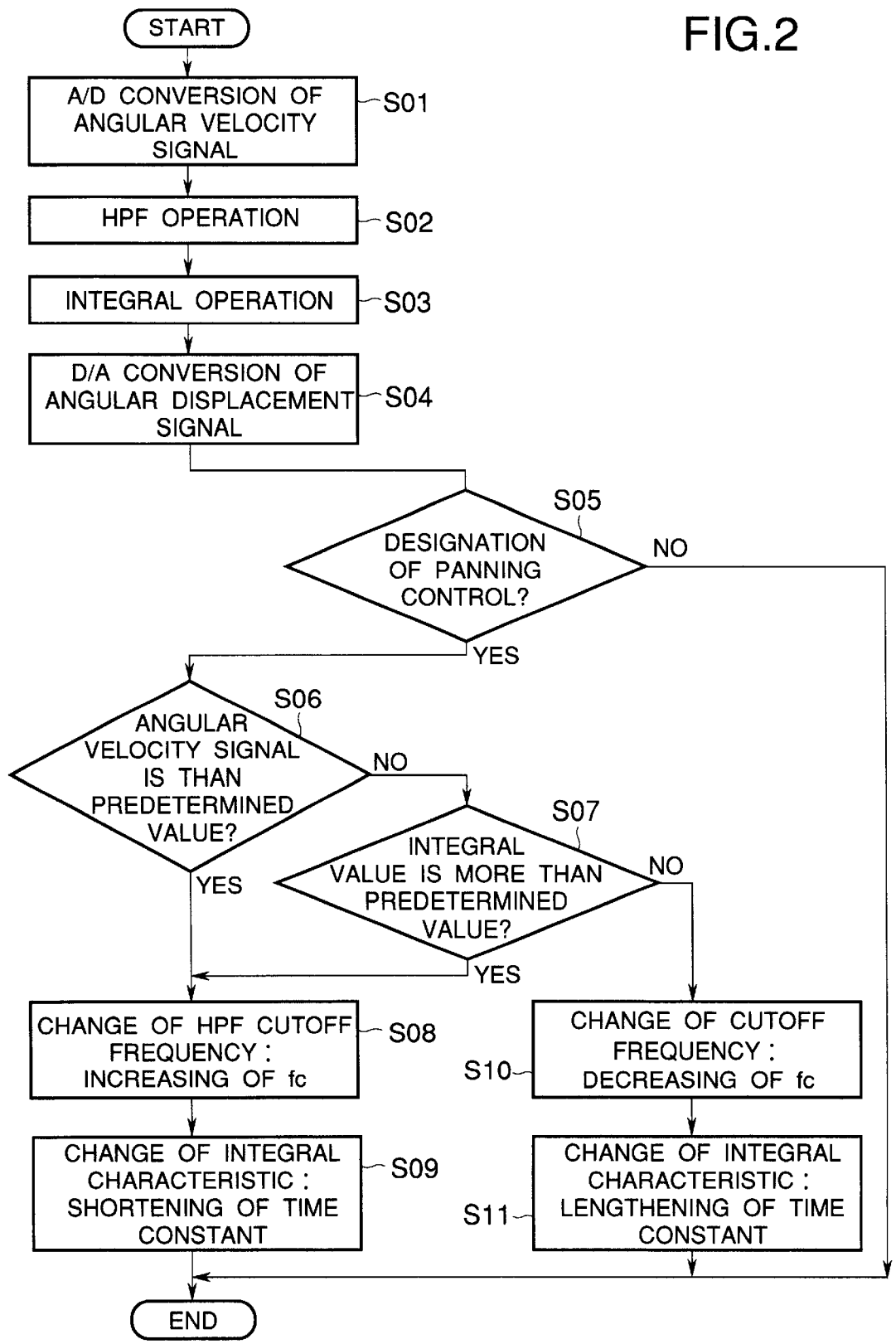
FIG. 2 is a flow chart showing a panning control sequence in the above-mentioned image pickup apparatus.

At first, as shown in FIG. 2, the A/D converter 104 converts the (analog) angular velocity signal, amplified in the amplifier 103, into a digital value that can be processed in the microcomputer 108b (step S01).

The microcomputer 108b executes a calculation on the angular velocity data from the A/D converter 104, utilizing a cut-off frequency (fc) prepared in the preceding calculation (step S02).

The integrator 108b executes an integration on the angular velocity data from the HPF 105b, utilizing a time constant prepared in the preceding operation (step S03).

The integration result (angular displacement data) outputted from the integrator 106b is converted into an analog value by an unrepresented D/A converter, which is not shown (step S04).

The pan/tilt discrimination circuit 107b discriminates whether an instruction for panning control has been given from the correction amount comparison circuit 109 (step S05).

If the step S05 identifies that the instruction for the panning control has not been given, the present sequence is terminated without any particular process.

If the step S05 identifies that the instruction for the panning control has been given, the pan/tilt discrimination circuit 107b discriminates whether the angular velocity data outputted from the A/D converter 104 is equal to or greater than a predetermined threshold value (step S06).

If the step S06 identifies that the angular velocity data is less than the predetermined threshold value, the pan/tilt discrimination circuit 107b discriminates whether the angular displacement data (angular displacement signal) converted into the analog value in the step S04 is equal to or greater than a predetermined threshold value (step S07).

In case the steps S06 and S07 identify that the angular velocity data is equal to or greater than the predetermined threshold value, or that the angular displacement signal (integration result) is equal to or greater than the predetermined threshold value even when the angular velocity data is less than the predetermined threshold value, the pan/tilt discrimination circuit 107b identifies a panning/tilting state whereby the sequence proceeds to a process starting from a step S08. On the other hand, in case the angular velocity data and the angular displacement signal are both less than the predetermined threshold values, there is identified a state under normal control or after the termination of panning/tilting, whereupon the sequence proceeds to a process starting from a step S10.

In a step S08, the pan/tilt discrimination circuit 107b increases the cut-off frequency, employed in the calculation in the HPF 105b, by a predetermined value from the current value, thereby increasing the attenuation rate for the low frequency signals. In a next step S09, the pan/tilt discrimination circuit 107b shortens the time constant, employed in the calculation in the integrator 106b, by a predetermined value from the current value, thereby bringing the angular displacement data closer to a reference value. The present sequence is terminated after the steps S08 and S09.

On the other hand, in a step S10, the pan/tilt discrimination circuit 107b decreases the cut-off frequency, employed in the calculation in the HPF 105b, by a predetermined value from the current value, thereby decreasing the attenuation rate for the low frequency signals. In a next step S11, the pan/tilt discrimination circuit 107b elongates the time constant, employed in the calculation in the integrator 106b, by a predetermined value from the current value, thereby increasing the effect of integration. The present sequence is terminated after the steps S10 and S11.

The sequence shown in FIG. 2, starting from the step S01, is repeated at a predetermined timing.

As explained in the foregoing, the microcomputer 108b, receiving the angular velocity outputted from the A/D converter 104 and the angular displacement outputted from the integrator 106b, identifies a panning or tilting state in case the angular velocity can reach at least the predetermined threshold value or in case the angular displacement, obtained by integrating the angular velocity, can reach at least the predetermined threshold value even if the angular velocity is less than the threshold value, and shifts the low region cut-off frequency of the HPF 105b to a higher frequency, thereby varying the characteristics in such a manner that the vibration correcting system in the image correction device 117 does not respond to the low frequency region as will be explained hereinafter. Also in other cases, it shortens the time constant of the integration characteristics of the integrator 106b in such a manner that the value accumulated in the integrator 106b is brought to the reference value (a value realized in the absence of vibration), in order to bring the position of correction of the image correction device 117 gradually to the center of the movable range.

Such panning control operation is controlled according to the output of the correction amount comparison circuit 109.

Also during such panning control operation, the angular velocity detection sensor 101 and the integrator 106b continue to respectively detect the angular velocity and the angular displacement, and, in case the panning or tilting is terminated, namely in case the angular velocity and the angular displacement can both be made smaller than the respective threshold values, the low region cut-off frequency of the HPF 105b is lowered again to expand the vibration correcting range and the panning control operation is terminated.

The camera signal process circuit 120 generates, from the image signal obtained from the image pickup optical system 118 and the image pickup element 119, the video signal (image signal) for example of NTSC format, for supply to the motion vector detection circuit 121.

The motion vector detection circuit 121 detects the motion vector based on the luminance signal contained in the image signal from the camera signal process circuit 120.

The motion vector can be detected for example by a correlation method or a block matching method.

As an example, the present embodiment employs the block matching method in the motion vector detection circuit 121.

The block matching method consists of dividing the input image signal into plural blocks of a suitable size (for example 8×8 pixels), calculating the difference, in the unit of each block, from the pixels in a predetermined range in a preceding field or frame, and searching a block of the preceding field or frame where the sum of the absolute values of the differences becomes minimum, thereby determining the relative displacement of such block as the motion vector thereof.

The matching calculation in the block matching method is detailedly explained for example by Ozaki et al., Information Processing Vol. 1.17, No. 7 pp634–640 (July 1976), and will not, therefore, be explained further.

The motion vector detection circuit 121 is provided, for example as shown in FIG. 3, with a filter 201 receiving the image signal from the camera signal process circuit 120; a binarization circuit 202 receiving the output of the filter 201; a memory circuit 206 for storing the preceding sample data of the binarization circuit 202; a correlation calculation circuit 203 for executing a correlation calculation between the outputs of the binarization circuit 202 and the memory circuit 206; a motion vector detection circuit 204 for detecting the motion vector from the output of the correlation calculation circuit 203; and a motion vector determination circuit 205 receiving the output of the motion vector detection circuit 204.

The output of the memory circuit 206 is supplied to the microcomputer 108a.

In the motion vector detection circuit 121 of the above-described configuration, the filter 201 is to eliminate the high spatial frequency component etc. from the image signal, and extracts the spatial frequency components effective for detecting the motion vector from the supplied image signal.

The binarization circuit 202 binarizes the image signal, outputted from the filter 201, with a predetermined binarizing level, for supply to the correlation calculation circuit 203 and the memory circuit 206.

The memory circuit 206 supplies the correlation calculation circuit 203 with the image signal from the binarization circuit 202, with a delay of a field period.

Consequently the correlation calculation circuit 203 receives the image signal from the binarization circuit 202 (image signal of current field), and that from the memory circuit 206 (image signal of preceding field).

The correlation calculation circuit 203 executes the correlation between the current and preceding fields, based on the above-described block matching method, and supplies the motion vector detection circuit 204 with the result of calculation (correlation value).

The motion vector detection circuit 204 detects the motion vector in the unit of each block, based on the correlation value supplied from the correlation calculation circuit 203. More specifically, it searches a block of the preceding field where the correlation value becomes minimum, and detects the relative displacement of such block as the motion vector.

The motion vector determination circuit 205 determines the entire motion vector, from the motion vectors of respective blocks supplied from the motion vector detection circuit 204. For example the entire motion vector is determined by the average or the center value of the motion vectors of the respective blocks.

The motion vector determined by the motion vector determination circuit 205 is supplied to the microcomputer 108a.

In the above-described configuration, the motion vector detection circuit 121 determines the displacement amounts (motion vector) in the vertical and horizontal directions, in the unit of a pixel.

Such motion vector indicates the displacement amount per unit time of the continuously picked-up image, or the remnant vibration in the picked-up image, and is proportional to the displacement amount of the continuously picked-up image. Stated differently, if the correction amount of the angular velocity detection sensor 101 (angular displacement data from the integrator 106b of the microcomputer 108b) does not contain an error, the motion vector is not detected on the pickup image. The motion vector constitutes auxiliary information in the correction of vibration, and, in the above-mentioned case, the auxiliary information also becomes "0".

In the microcomputer 108a, the HPF 105a is capable of varying the characteristics thereof in an arbitrary frequency region, and transmits the motion vector data per unit time, outputted from the motion vector detection circuit 121, by cutting off the low frequency components contained therein.

The integrator 106a integrates the motion vector data from the HPF 105a and outputs the result of integration (sum of displacement amount) as a displacement data of the motion vector.

Similar to the panning control process (FIG. 2) in the microcomputer 108b of the angular velocity detection sensor 101, the pan/tilt discrimination circuit 107a discriminates a panning/tilting state based on the motion vector data (motion vector amount) per unit time from the motion vector detection circuit 121 and the displacement data of the motion vector (sum of motion vector) from the integrator 106a, thereby executing a panning control operation. The pan/tilt discrimination circuit 107a also executes such control according to the output of the correction amount comparison circuit 109.

More specifically, the pan/tilt discrimination circuit 107a executes the panning control operation when the motion vector amount per unit time from the motion vector detection circuit 121 and the displacement amount of the motion vector from the integrator 106a respectively exceed the predetermined threshold values, only if an instruction for the panning control is given from the correction amount comparison circuit 109.

The correction amount comparison circuit 109 is a component constituting the largest feature of the present embodiment, and functions in the following manner.

Figure 4:
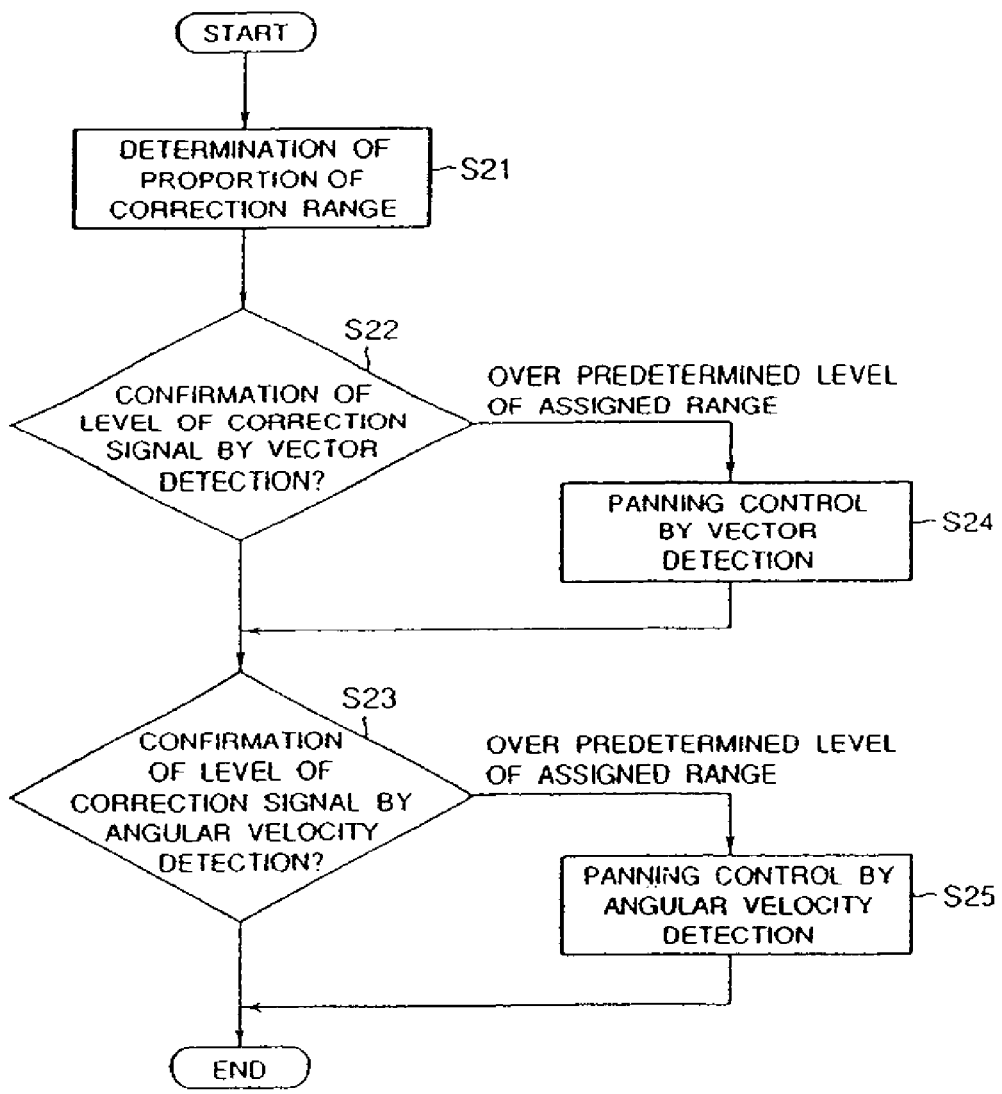
FIG. 4 is a flow chart showing the control sequence of a correction amount comparison circuit in the above-mentioned image pickup apparatus.
Figure 11:
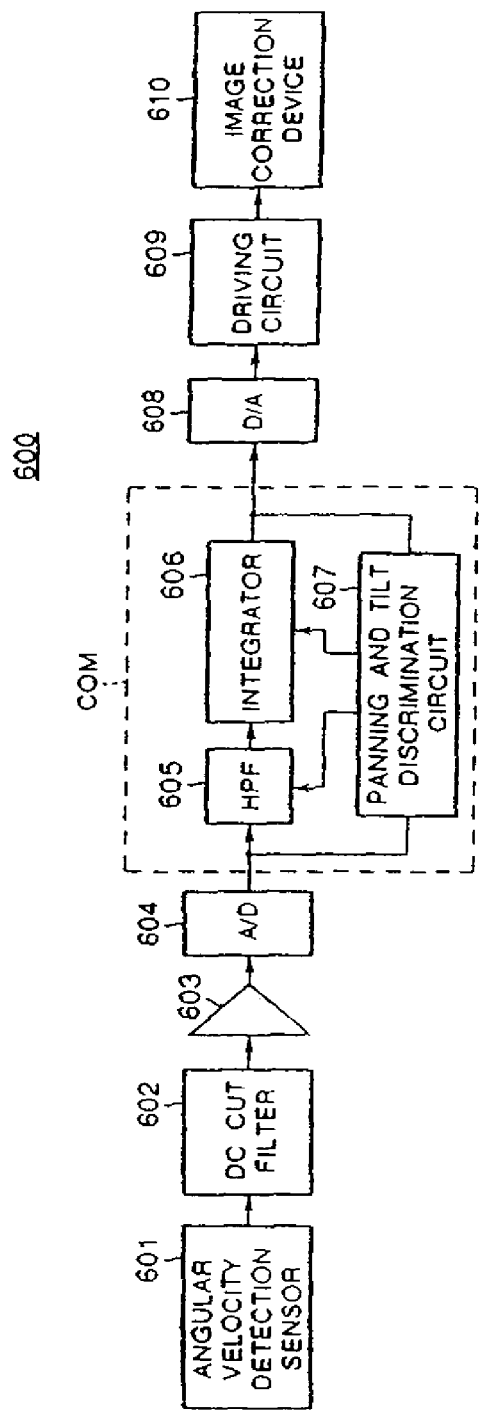

For example as shown in FIG. 4, there is at first determined the assignment of the correction ranges for the vibration detecting systems in the angular velocity detection sensor 101 and the motion vector detection circuit 121, with respect to the correction range in the image pickup optical system 118 (step S21). Such assignment or proportion may be varied according to parameters to be explained hereinafter, but, for the simplicity of description, it is assumed that the correction amount of the angular velocity detection sensor 101 (angular displacement data from the integrator 106b of the microcomputer 108b) and the correction amount of the motion vector detection circuit 121 (displacement data of the motion vector from the integrator 106a of the microcomputer 108a) respectively represent 50% of the entire correcting range.

Then there is confirmed the level of the correction value of the motion vector detection circuit 121 within the range assigned in the step S21 (step S22), and, when a predetermined level within the assigned range is exceeded in this confirmation, the panning control is assumed, whereupon an instruction for the panning control is issued to the microcomputer 108a of the motion vector detection circuit 121 (step S24) and the sequence proceeds to a next step. On the other hand, if the panning control is not assumed in the confirmation of the step S22, the sequence proceeds to a step S23.

A step S23 confirms the level of the correction value of the angular velocity detection sensor 101 within the range assigned in the step S21, and, when a predetermined level within the assigned range is exceeded in this confirmation, the panning control is assumed, whereupon an instruction for the panning control is issued to the microcomputer 108b of the angular velocity detection sensor 101 (step S25) and the present sequence is terminated. On the other hand, if the panning control is not assumed in the confirmation of the step S23, the sequence is immediately terminated.

The above-explained sequence starting from the step S21 in FIG. 4 is repeated at a predetermined interval.

As explained in the foregoing, the correction amount comparison circuit 109 controls the execution of panning control at the motion vector detection circuit 121, and at the angular velocity detection sensor 101, based on the correction amount at the motion vector detection circuit 121, and at the angular velocity detection sensor 101. As a result, the increase in the correction amount at the motion vector detection circuit 121 and the increase in the correction amount at the angular velocity detection sensor 101 are respectively given certain limitations.

The adder 110 adds the displacement data of the motion vector outputted from the integrator 106a of the microcomputer 108a (correction amount at the motion vector detection circuit 121), and the angular displacement data outputted from the integrator 106b of the microcomputer 108b (correction amount at the angular velocity detecting circuit 101), and supplies the adder 111 with the result of addition as a control signal.

The adder 111 adds the control signal from the adder 110 and the output of the encoder 116 in opposite polarities and supplies the amplifier 112 with the result of such addition.

The amplifier 112 amplifies the result of addition (added output signal) of the adder 111 to an appropriate sensitivity.

The drive circuit 113 drives the actuator 114 of the image correction device 117 according to the output signal of the amplifier 112, as will be explained hereinafter in more detail.

In the image correction device 117, the actuator 114 is of a voice coil type for driving the variable angle prism 115, and drives the variable angle prism 115 by being driven by the drive circuit 113.

The angle of the variable angle prism 115 is varied by the drive from the drive circuit 113.

The encoder 116 detects the displacement in the angle of the variable angle prism 115, and supplies the above-described adder 111 with the result of such detection.

Figure 5:
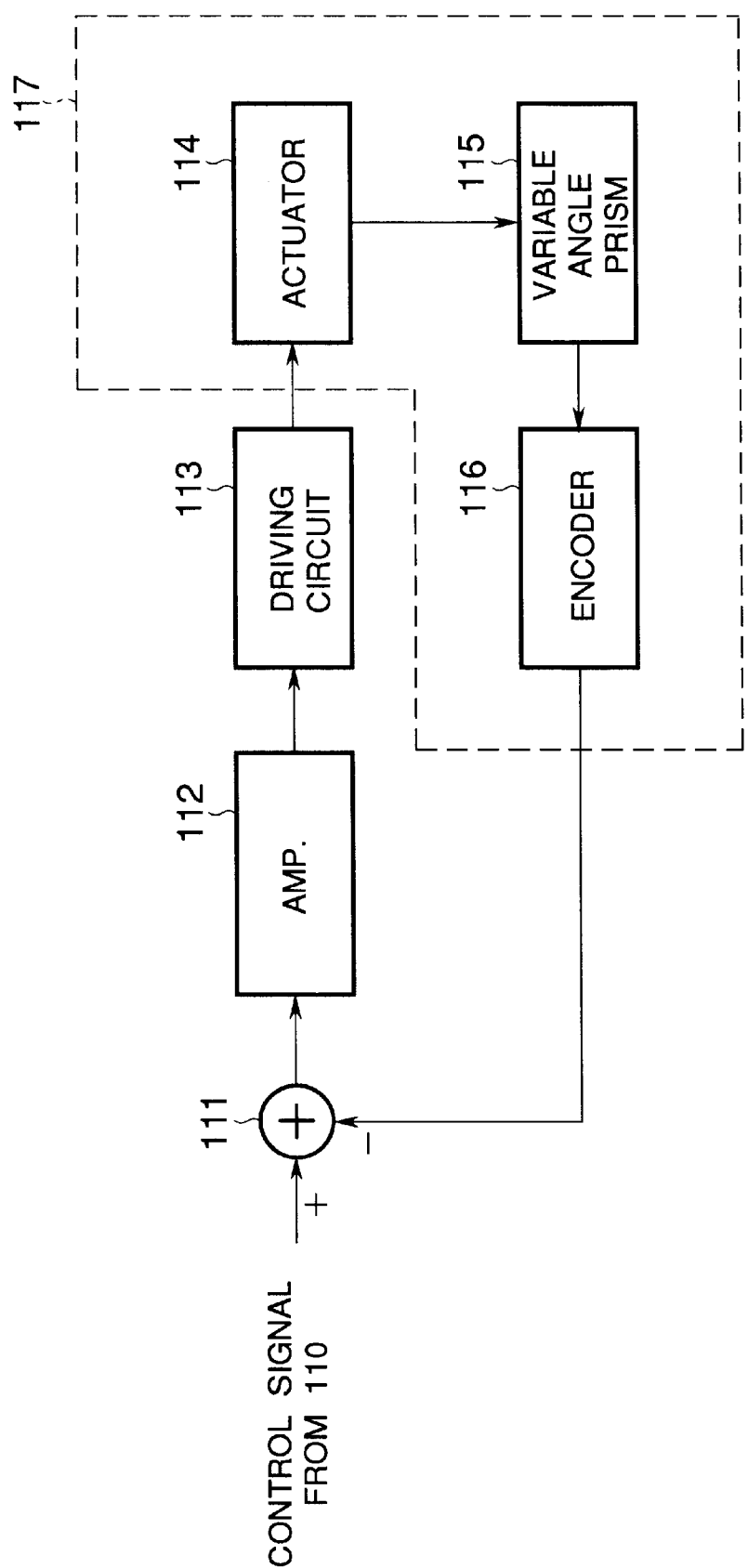
FIG. 5 is a block diagram showing a control system in an image correction device of the above-mentioned image pickup apparatus.

As shown in FIG. 5, the image correction device 117 includes the variable angle prism 115 and the actuator 114 of voice coil type for driving the prism, and a closed-loop control system is constituted by detecting the displacement in the angle of the variable angle prism 115 with the encoder 116, and supplying the adder 111 with the result of detection thereby achieving a feedback to the actuator 114 and controlling the drive amount for the variable angle prism 115.

In the following, a more detailed explanation will be given on the image correction device 117.

As shown in FIG. 6A, the variable angle prism 115 is composed, for example, of flat glass plates 301, 301' positioned in a mutually opposed manner, a highly refractive liquid 302 consisting of a transparent elastic member or transparent inert liquid of a high refractive index (refractive index n), and a sealing member 303 such as a resinous film for elastically sealing the highly refractive liquid 302.

In FIG. 6A, a ray 304 indicates the path of light perpendicularly entering the flat glass plate 301 and transmitted by the high refractive liquid 302 and the glass plate 301'.

FIG. 6A shows a state in which the flat glass plates 301, 301' are supported in a mutually parallel state, wherein the ray 304 perpendicularly enters the glass plate 301, then is transmitted by the highly refractive liquid 302 and perpendicularly emerges from the glass plate 301'.

On the other hand, FIG. 6B shows a state in which the flat glass plate 301' is inclined by the actuator 114 of voice coil type, whereby the optical axis is deflected.

In this state, the flat glass plates 301, 301' and the highly refractive liquid 302 constitutes an optical prism, whereby the ray perpendicularly entering the glass plate 301 is deflected, upon emerging from the glass plate 301', as indicated by a path 304', in comparison with the optical path 304 in the mutually parallel state shown in FIG. 6A.

Further referring to FIG. 6B, when the flat glass plate 301' of the variable angle prism 115 is rotated by an angle $\sigma$ with respect to the flat glass plate 301, the light beam perpendicularly entering the flat glass plate 301 emerges, by a principle of a wedge-shaped prism, with the deflection by an angle $\Phi=(n-1)\sigma$. Thus the optical axis 304' of the incident light beam is deflected by such angle.

It is assumed that refractive index n is close to that of glass.

Figure 7:
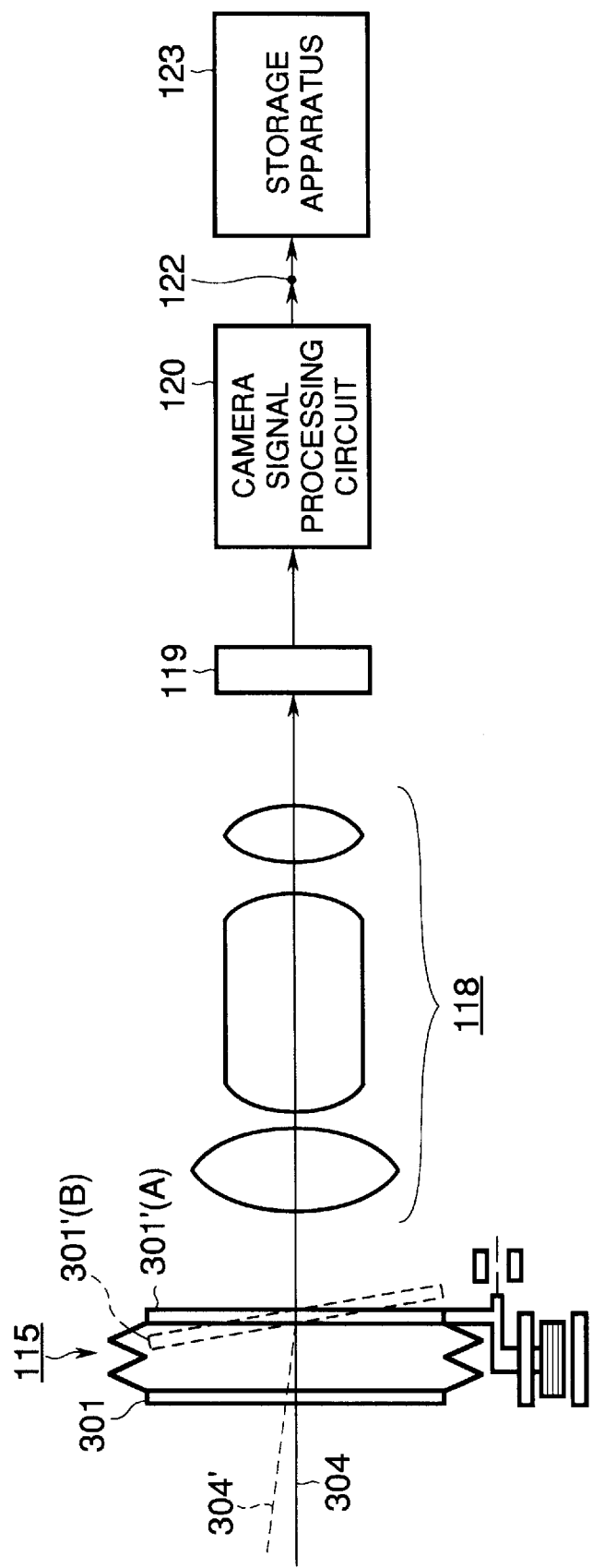
FIG. 7 is a view showing the correction of optical axis by the variable angle prism mentioned above.

The correction of the optical axis by the variable angle prism 115 is executed in the following manner. When the flat glass plate 301' is parallel to the flat glass plate 301 as shown in FIG. 7 (state A), the optical path 304 is linear, through the image pickup optical system 118, to the image forming plane of the image pickup element 119 such as a CCD.

On the other hand, if the flat glass plate 301' is inclined with respect to the flat glass plate 301 (state B), the optical path is shifted as indicated by 304', in comparison with the optical path 304 in the parallel state A. More specifically, because of a change in the angle formed by the flat glass plates 301 and 301', the optical path is shifted as indicated by 304' and such shifted optical path 304' is lead, through the image pickup optical system 118, to the image forming plane of the image pickup element 119. It is therefore rendered possible to optically correct the displacement of the object, resulting for example from the vibration of the apparatus, on the image forming plane of the image pickup element 119.

The actuator 114, when driven by the drive circuit 113, rotates the flat glass plate 301' of the variable angle prism 115, thereby varying the vertical angle thereof.

More specifically, as shown in FIGS. 6A and 6B, the actuator is of a voice coil type composed of a yoke 311, a magnet 312, a coil 313 and an arm 314 for transmitting the driving torque, and the vertical angle of the prism 115 can be varied by a current supply to the coil 313.

The encoder 116, consisting of an angular displacement encoder for detecting the angular displacement in the vertical angle of the variable angle prism 115, is composed, as shown in FIGS. 6A and 6B, of a slit 321 for detecting the angular displacement of the prism 115, a light emitting diode 322 for detecting the position of the slit 321, and a PSD (position sensing detector) 323 for detecting the position of the slit 321 in cooperation with the light emitting diode 322.

The slit 321 rotates, through the arm 314 of the actuator 114, together with the flat glass plate 301' of the variable angle prism 115, thereby being shifted in position. The position of the slit 321 is detected by the light emitting diode 322 and the PSD 323 whereby the displacement in the angle of the variable angle prism 115 is detected.

In the image correction device 117, as explained in the foregoing, the actuator 114 is driven by the drive circuit 113 to vary the vertical angle of the variable angle prism 115. As a result, a light beam with a varied incident angle is focused on the image forming plane of the image pickup element 119 through the image pickup optical system 118, as shown in FIG. 7. The output of the image pickup element 119 is subjected to predetermined signal processing in the camera signal process circuit 120 and is supplied for example to a recording apparatus 123 through the video output terminal 122 and also to the motion vector detection circuit 121.

Also the displacement in the angle of the variable angle prism 115 is detected by the encoder 116 and is fed back to the drive circuit 113. More specifically, as shown in FIG. 5, it is supplied to the adder 111, in which it is added with the control signal from the adder 110 and supplied to the drive circuit 113 through the amplifier 112.

The control system constituting such closed loop functions in such a manner that the control signal from the adder 110, namely the sum of the correction amount at the motion vector detection circuit 121 (output of the microcomputer 108*a*) and the correction amount at the angular velocity detection sensor 101 (output of the microcomputer 108*b*), becomes equal to the angular displacement of the variable angle prism 115 detected by the encoder 116. As a result, the variable angle prism is so driven that the control signal from the adder 110 coincides with the output of the encoder 116.

Though omitted from FIGS. 6A and 6B for the purpose of simplicity, there are also provided a drive circuit, an encoder and a control system of a similar function in a direction perpendicular to the driving direction of the above-described variable angle prism 115, whereby there are enabled the corrections in the vertical direction and in the horizontal direction.

As explained in the foregoing, the present embodiment optically corrects the vibration in the picked-up image by respectively limiting the increase in the correction amount at the motion vector detection circuit 121 and the increase in the correction amount at the angular velocity detection sensor 101, utilizing the correction amount comparison circuit 109 and based on the correction amounts at the motion vector detection circuit 121 and at the angular velocity detection sensor 101.

The panning control by the pan/tilt discrimination circuits 107*a*, 107*b* is executed by the sum of the outputs of the integrators 106*a*, 106*b* because the sum of the outputs of the integrators becomes the correction amount (target control value) of the image correction device 117, and the panning control is assumed when the sum of the outputs of the integrators exceeds a predetermined value in order not to exceed the correction range for the image correction device 117.

Consequently, the vibration can be corrected with a higher precision by correction based on the correction amount at the angular velocity detection sensor 101 and that at the motion vector detection circuit 121. An even higher precision can also be achieved in the vibration correction by respectively limiting the increase in the correction amount, based on the correction amount at the angular velocity detection sensor 101 and the correction amount at the motion vector detection circuit 121.

In the following there will be explained, with reference to FIGS. 8A to 8D, the states of correction of vibration in the picked-up image in the above-described configuration.

In each of FIGS. 8A to 8D, the abscissa indicates a range of correction amount from 0 to 100% or from 0 to 50% in an optical correcting direction.

Figure 8A:
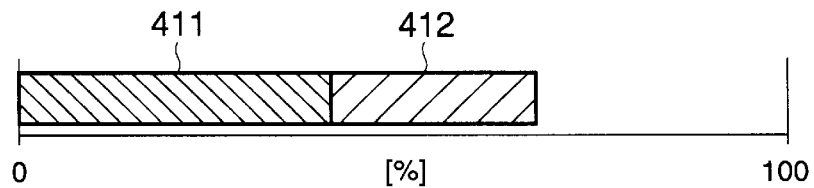
FIGS. 8A, 8B, 8C and 8D are views showing different states of correction of vibration in the picked-up image in the above-mentioned image pickup apparatus.

At first, in FIG. 8A, a graph portion 411 indicates the correction status (correction amount) of the vibration correction obtained in the motion vector detection circuit 121, while a portion 412 indicates the correction status (correction amount) of the vibration correction obtained in the angular velocity detection sensor 101.

Figure 8B:
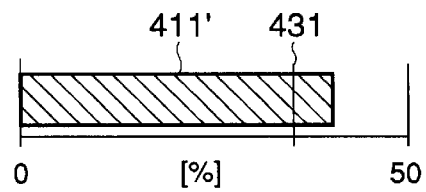

FIG. 8B separately shows the correction range assigned to the motion vector detection circuit 121 within the entire correction range, and the maximum correction amount becomes 50% if a half of the entire correction range is assigned to the motion vector detection circuit 121. A graph portion 411' is equal to the correction amount 411 in FIG. 8A. A line 431 indicates the threshold value in judging the panning control for the correction amount 411 at the motion vector detection circuit 121.

If the threshold value 431 is set at about 40% as shown in FIG. 8B, the correction amount 411 of the motion vector detection circuit 121 in the illustrated case already exceeds the threshold value 431, so that the panning control is executed in the motion vector detection circuit 121 according to the process shown in FIG. 4.

Figure 8C:
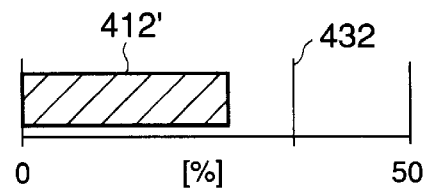
Figure 8D:
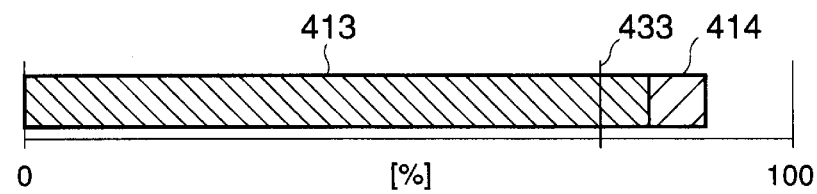

Similar to FIG. 8B, FIG. 8C separately shows the correction range assigned to the angular velocity detection sensor 101 within the entire correction range, and the maximum correction amount or the remaining correction amount becomes 50% if a half of the entire correction range is assigned to the angular velocity detection sensor 101. A graph portion 412' is equal to the correction amount 412 in FIG. 8A.

A line 432 indicates the threshold value in judging the panning control for the correction amount 412 at the angular velocity detection sensor 121.

If the threshold value 432 is set at about 40% as shown in FIG. 8C, the correction amount 412' of the angular velocity detection sensor 101 in the illustrated case is less than the threshold value 432, so that the panning control is not executed in the angular velocity detection sensor 101 according to the process shown in FIG. 4.

In the state shown in FIG. 8A, as will be apparent from the foregoing description, the correction amount at the motion vector detection circuit 121 is already in the level of executing the panning control, so that the target control value does not increase much but tends to decrease in the control. However, the correction amount at the angular velocity detection sensor 101 does not reach the level of executing the panning control so that the ordinary correction of vibration can be realized.

Such situation is encountered in case there is continuously generated the vibration of 1 Hz or lower for which the detection level is lowered for the vibration gyro employed in the angular velocity detection sensor 101, but, even under such situation, the information on the frequency components higher than 1 Hz, detected by the angular velocity detection sensor 101, is reflected on the correction amount so that there is only executed the correction for the higher frequency components.

Consequently there can be smoothly controlled the correction for the vibration in the picked-up image, and the correcting performance can be improved.

On the other hand, in the conventional configuration, the correction amount 413 at the motion vector detection circuit already exceeds the threshold value 433 for executing the panning control, so that the motion vector detection circuit and the angular velocity detection sensor simultaneously execute the panning control. Thus the angular velocity detection sensor enters the panning control despite the limited correction amount 414. As a result, sufficient vibration correction cannot be realized.

As already explained in the foregoing, the proportion of the correction ranges of the motion vector detection circuit 121 and the angular velocity detection sensor 101 in the optical correction range may be varied according to other external parameters.

As an example, if the object is dark, the motion vector determined from the picked-up image may be attenuated or the detection of the motion vector may become difficult. Under such conditions, the smooth vibration correction can be maintained at a certain level by enlarging the correction range at the angular velocity detection sensor 101.

Also in an optical system equipped with a so-called zoom lens in which the image magnification can be optically modified, even in case there is selected the telephoto side in which the correction error becomes conspicuous, the proportion of the correction ranges can be modified accordingly.

Figure 9:
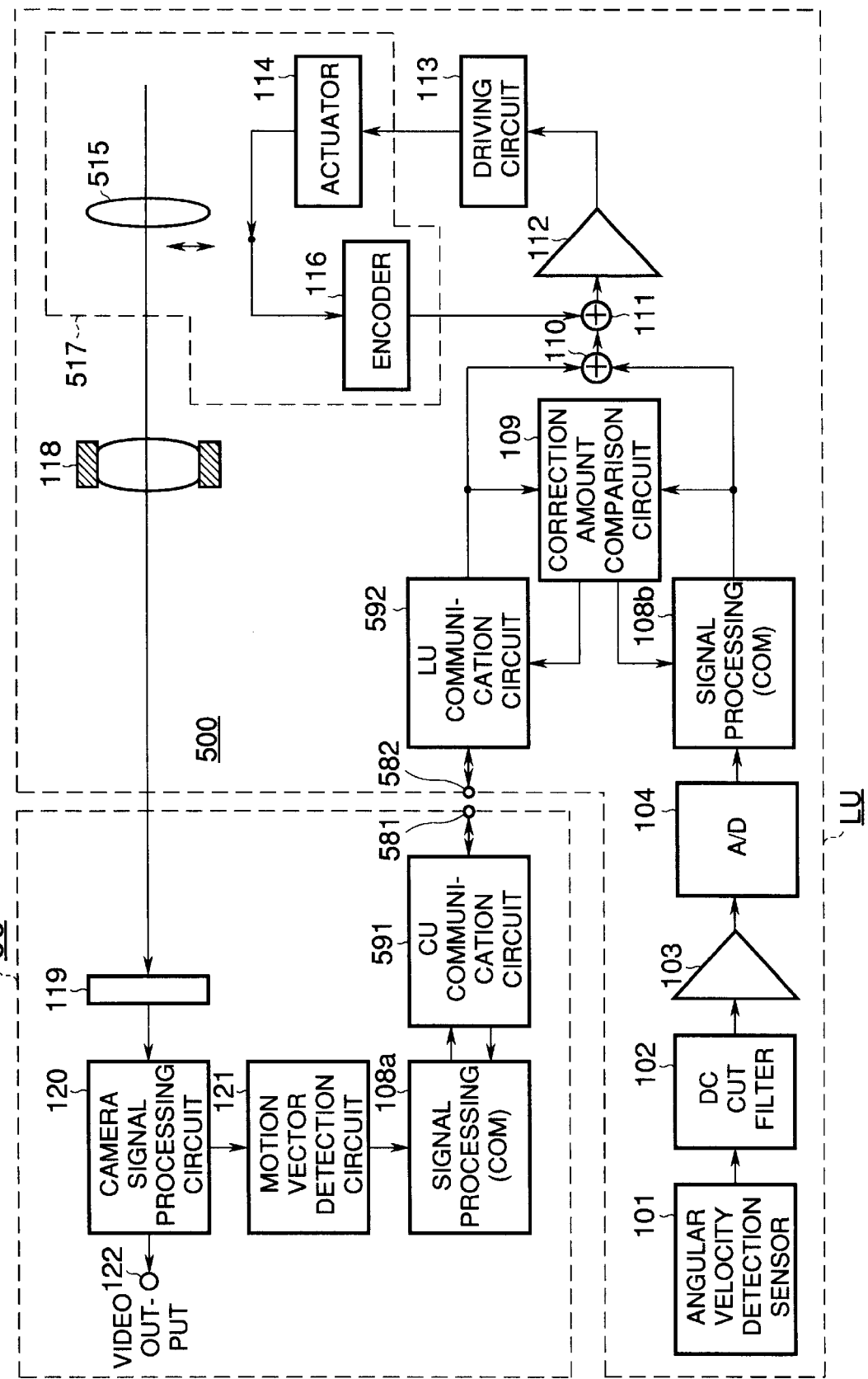
FIG. 9 is a block diagram showing the configuration of an image pickup apparatus employing a vibration correcting device of the present invention and constituting a second embodiment.

The vibration correcting device of a second embodiment of the present invention is applicable, for example, to an image pickup apparatus 500 shown in FIG. 9, which embodies the present invention.

The image pickup apparatus 500 is most featured, in comparison with the conventional configuration, by the presence of a correction amount comparison circuit 109 and by a configuration separable into a camera unit CU and a lens unit LU, as shown in FIG. 9.

The configuration separable into the camera unit CU and the lens unit LU is achieved by a connecting structure employing so-called bayonet mount, and is employed for example in a single-lens reflex camera or in a video camera.

The camera unit CU and the lens unit LU are electrically connected by electrical contacts 581, 582 when they are mutually coupled by the bayonet mount.

More specifically, the image pickup apparatus 500 is provided, in addition to the circuits provided in the image pickup apparatus 100 shown in FIG. 1, with a CU communication circuit 591 receiving the output of the microcomputer 108*a* and sending output thereto; and an LU communication circuit 592 receiving the output of the correction amount comparison circuit 109 and sending output thereto.

The CU communication circuit 591 is provided in the camera unit CU including the image pickup element 119, the camera signal process circuit 120, the motion vector detection circuit 121 and the microcomputer 108*a*, while the LU communication circuit 592 is provided in the lens unit LU including other circuits.

The CU communication circuit 591 and the LU communication circuit 592 exchange information through the contacts 581, 582 when the camera unit CU and the lens unit LU are mutually coupled.

The CU communication circuit 591 and the LU communication circuit 592 are respectively composed of one-chip microcomputers and are so constructed as to transmit the information for vibration correction, among the information to be transmitted.

The image pickup apparatus 500 is provided, instead of the image correction device 117 employing the aforementioned variable angle prism 115, with an image correction device 517 employing a shift lens 515, which constitutes an optical correction system movable in a direction perpendicular to the optical axis.

In the image pickup apparatus 500 shown in FIG. 9, elements equivalent to those in the image pickup apparatus 100 shown in FIG. 1 are represented by corresponding numbers and will not be explained further.

At first, in the camera CU, the motion vector is detected from the image signal obtained from the image pickup element 119 as explained in the foregoing, then the correction error (remnant vibration) caused in the angular velocity detection sensor 101 such as the vibration gyro is normalized as the motion vector amount on the image forming plane of the image pickup element 119 and is transferred at a predetermined timing to the lens unit LU, as the auxiliary information for the correction of vibration, through the CU communication circuit 591.

On the other hand, in the lens unit LU, the auxiliary information transferred from the camera unit CU is received by the LU communication circuit 592, and is added in the adder 110 to the correction amount obtained from the detection output of the angular velocity detection sensor 101 in order to drive a shift lens 515 of the image correction device 517. The auxiliary information is also given to the correction amount comparison circuit 109.

As the shift lens 515 can be driven with a configuration similar to that for the aforementioned variable angle prism 115, the driving configuration will not be explained in more detail.

The motion vector amount (auxiliary information of vibration correction) obtained in the motion vector detection circuit 121 indicates the amount of displacement on the continuous image forming plane per unit time as explained in the foregoing, and is proportional to the amount of displacement of the continuous picked-up image. Therefore, if the correction amount at the angular velocity detection sensor 101 does not contain an error, the motion vector on the picked-up image is not detected and the auxiliary amount at the motion vector detection circuit 121 also becomes "0".

The above-mentioned auxiliary information (motion vector amount) for the vibration correction is transferred from the camera unit CU to the lens unit LU through the CU communication circuit 591 and the LU communication circuit 592, at a predetermined timing for example synchronized with the vertical sync signal of the video signal.

The CU communication circuit 591 and the LU communication circuit 592 may be provided with an electrical data transmitting function, for example serial communication, such as a function based on the VL format which is the format for the interchangeable lenses for the video camera.

In the following there will be explained, with reference to FIGS. 10A and 10B, the functions of the CU communication circuit 591 and the LU communication circuit 592 at the data transfer between the camera unit CU and the lens unit LU.

Figure 10B:
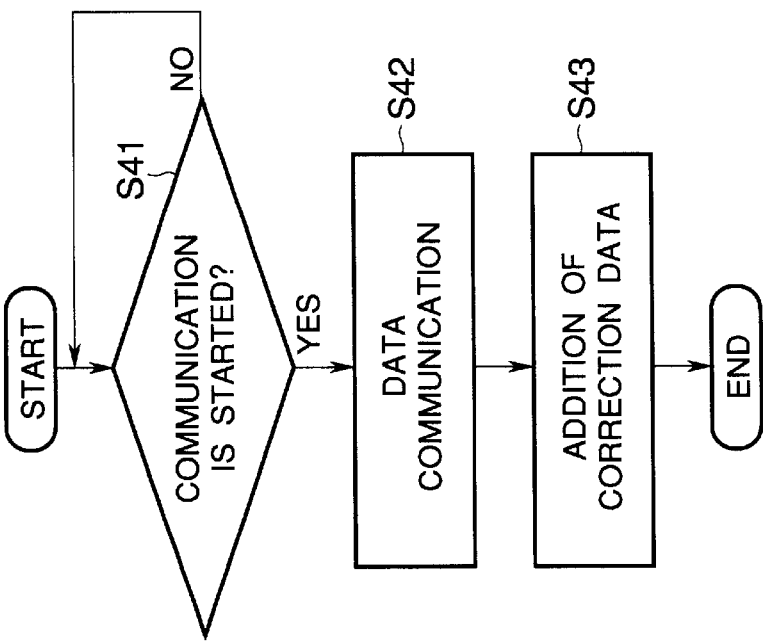
FIGS. 10A and 10B are flow charts showing the data communicating operation in the above-mentioned image pickup apparatus.
Figure 10A:
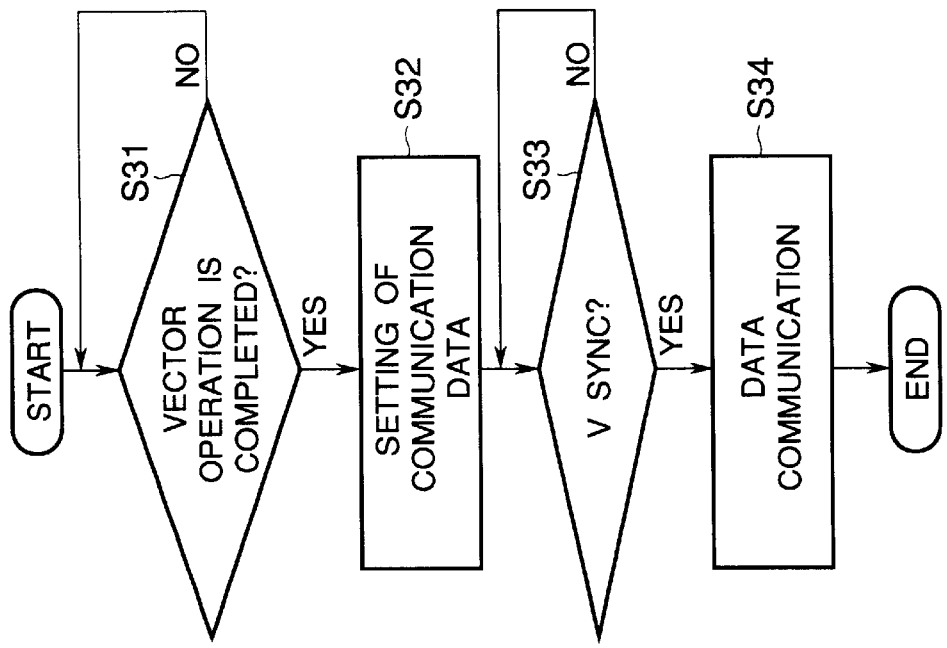
Figure 11:
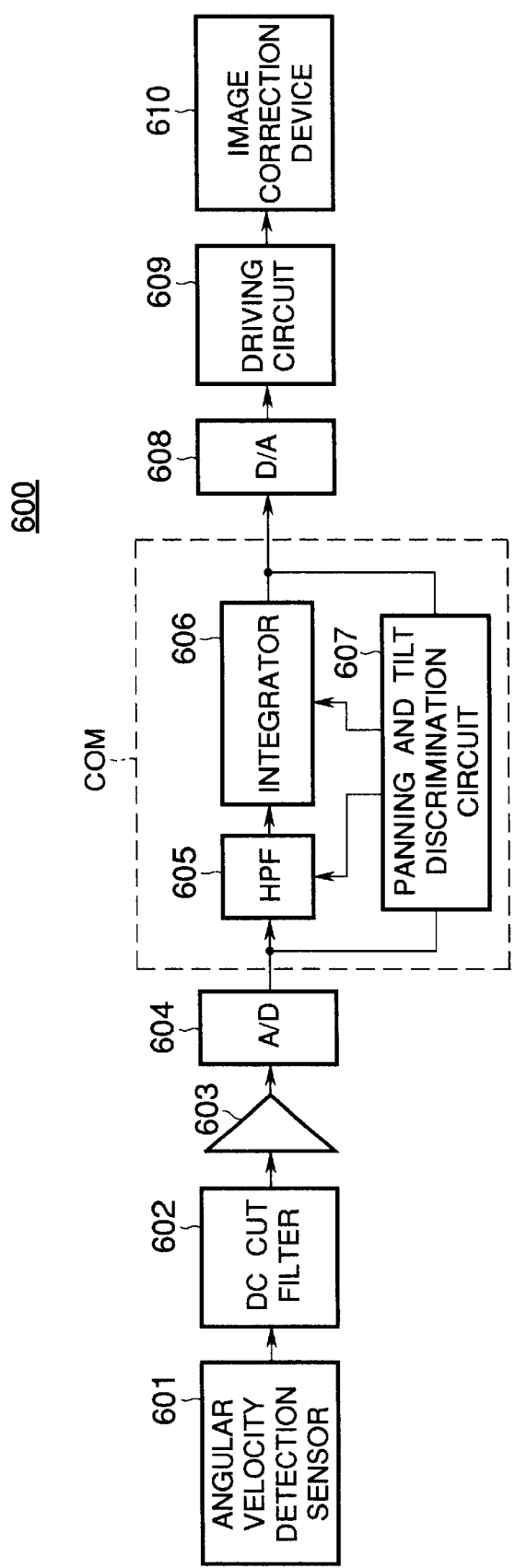
FIG. 11 is a block diagram showing the configuration of a conventional vibration correcting function.
Figure 12:
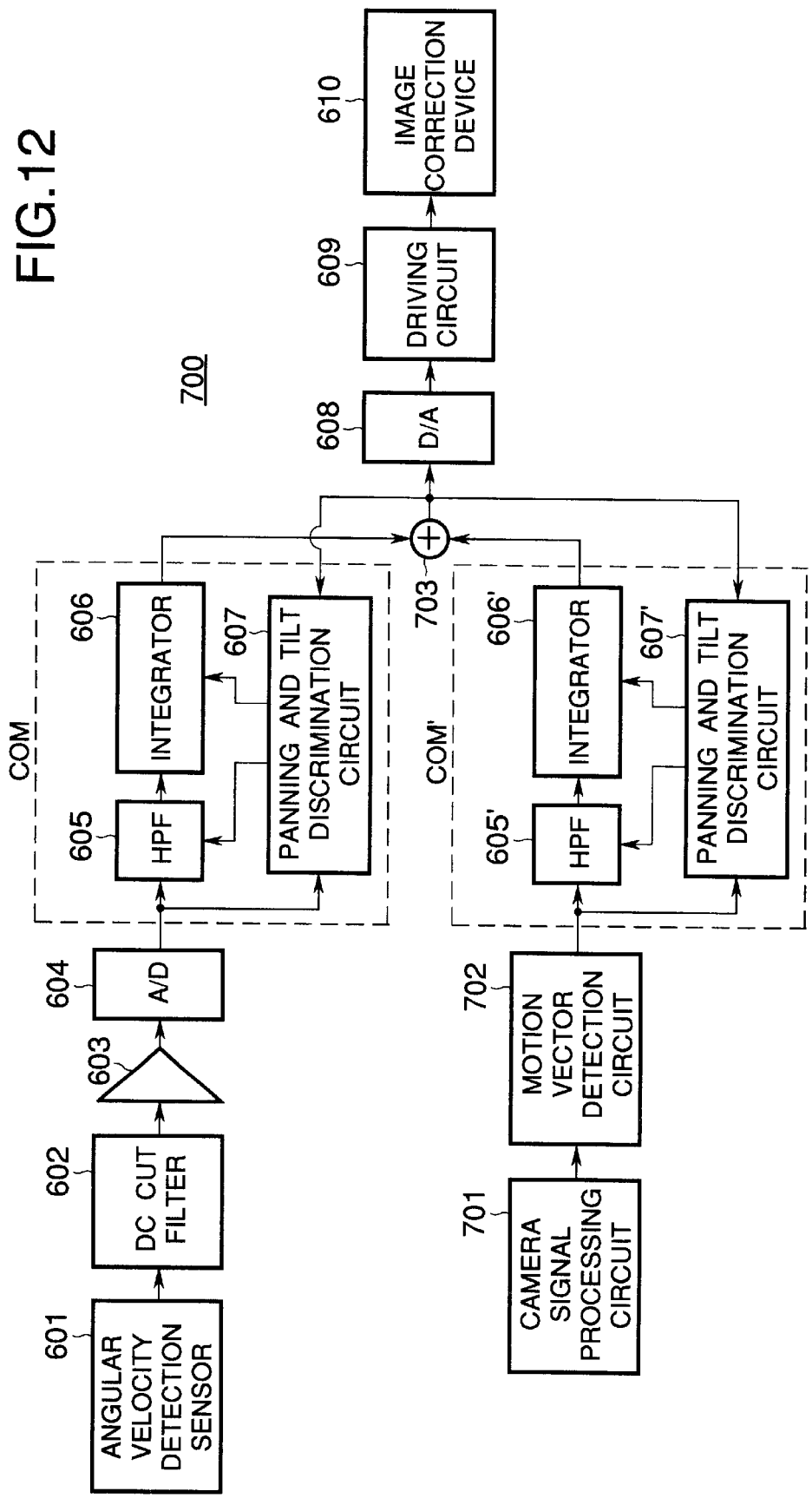
FIG. 12 is a block diagram showing the configuration of another conventional vibration correcting function.

In the CU communication circuit 591, as shown in FIG. 10A, the microcomputer 108*a* at first discriminates whether the calculation of the correction amount (displacement amount of motion vector) has been completed in the motion vector detection circuit 121 (step S31).

If the step S31 identifies that the calculation has been completed, the sequence proceeds to a next step S32, but, if not completed, the sequence awaits the completion of the calculation.

In a step S32, the correction amount obtained in the microcomputer 108*a* is set, as the auxiliary information for the vibration correction, in the communication data to be transferred to the lens unit LU.

Then there is discriminated whether a vertical synchronization signal has been generated in the image signal obtained in the camera signal process circuit 120 (step S33).

If the vertical sync signal is identified in the step S33 to have been generated, the sequence proceeds to a next step S34, but, if not, the sequence awaits the generation of the vertical sync signal.

Then a step S34 initiates the communication with the lens unit LU by sending thereto a signal indicating the start of communication and transfer the communication data set in the step S32, and the sequence is then terminated.

The process starting from the step S31 is repeated at a predetermined interval.

In the LU communication circuit 592, there is at first discriminated whether a signal, indicating the start of communication, has been transferred from the camera unit CU (step S41).

If the step S41 identifies that the communication is started, the sequence proceeds to a next step S42, but, if not started, the sequence awaits the start of communication.

A step S42 initiates the communication with the camera unit CU.

Then the auxiliary information for the vibration correction, contained in the communication data transferred from the camera unit CU, is supplied to the correction amount comparison circuit 109 and the adder 110 (step S43).

Thus the adder 110 adds the correction amount (auxiliary information of vibration correction) at the motion vector detection circuit 121 to the correction amount at the angular velocity detection sensor 101, and the result of such addition is used for driving the shift lens 515 of the image correction device 517, thereby optically correcting the vibration in the picked-up image.

The processing starting from the step S41 is repeated at a predetermined interval.

The data transfer between the camera unit CU and the lens unit LU is executed in the above-described manner.

In this operation, the auxiliary information of the vibration correction transferred to the lens unit LU, namely the correction amount of the motion vector detection circuit 121, is also given to the correction amount comparison circuit 109, which discriminates whether the panning control is to be executed in the above-described manner, and the result of such discrimination is supplied to the microcomputer 108b and is also transferred to the camera unit CU through the LU communication circuit 592.

Consequently the vibration in the picked-up image is optically corrected, based on the correction amount at the motion vector detection circuit 121 and on the correction amount at the angular velocity detection sensor 101, since the increase of such correction amounts is limited.

In the present embodiment, in a configuration separable into the camera unit CU and the lens unit LU as explained in the foregoing, the information for correcting the vibration is communicated between the camera unit CU and the lens unit LU through the CU communication circuit 591 and the LU communication circuit 592, thereby respectively limiting the increase in the correction amount at the motion vector detection circuit 121 and in the correction amount at the angular velocity detection sensor 101.

Such configuration allows smooth control for the correction of vibration in the picked-up image even in the image pickup apparatus employing the lens coupling system such as the bayonet mount, thereby improving the correcting performance.

In the foregoing description, as shown in FIGS. 10A and 10B, the motion vector amount is transferred from the camera unit CU to the lens unit LU as the auxiliary information for the vibration correction in order to discriminate whether the panning control is to be executed, but it is also possible to simultaneously transfer other information such as auto focusing information or auto exposure information.

As explained in the foregoing, the output of the vibration correction amounts is controlled according to the vibration correction amount obtained from the vibration amount of the apparatus itself and the vibration correction amount obtained from the vibration amount of the picked-up image, and the vibration in the picked-up image is corrected by thus controlled vibration amounts. For example, the vibration correction amounts are mutually compared, and the increases of the outputted vibration correction amounts are limited according to the result of such comparison. The vibration in the picked-up image is optically corrected by thus limited vibration correction amounts, utilizing for example a prism with a variable vertical angle (variable angle prism) positioned perpendicularly to the optical axis, or a lens group movable perpendicularly to the optical axis.

Such configuration allows smooth control for the correction of vibration in the picked-up image without complex process, thereby improving the vibration correcting performance for the picked-up image.

Many widely different embodiments of the present invention may be constructed without departing from the spirit and scope of the present invention. It should be understood that the present invention is not limited to the specific embodiments described in the specification, except as defined in the appended claims.

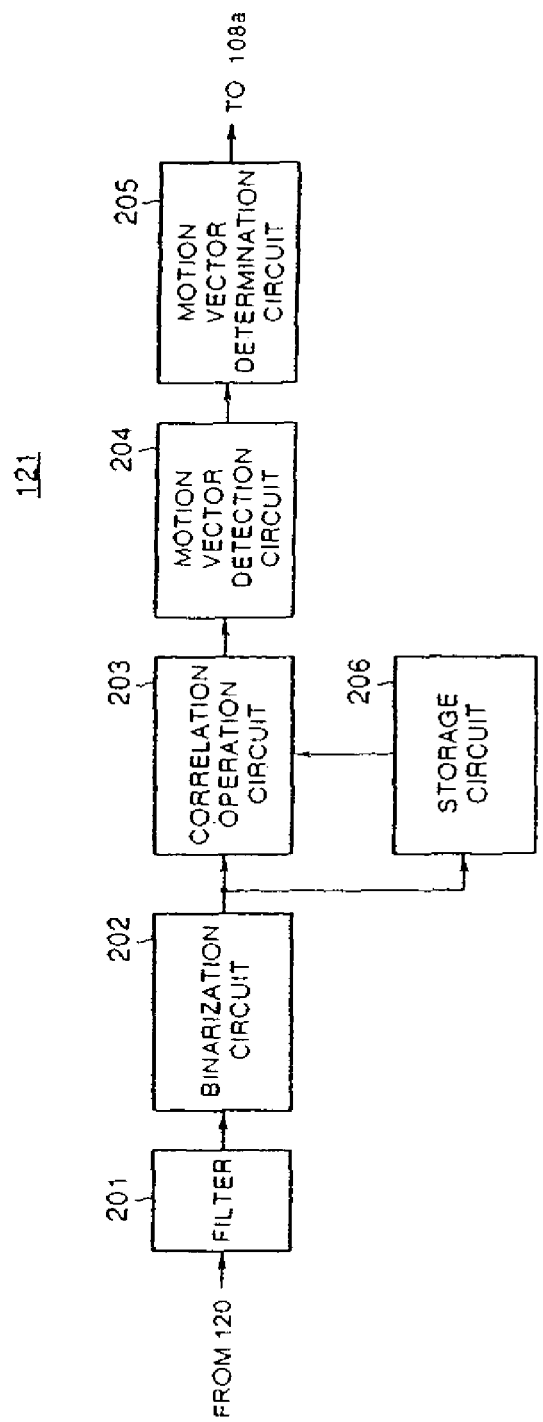

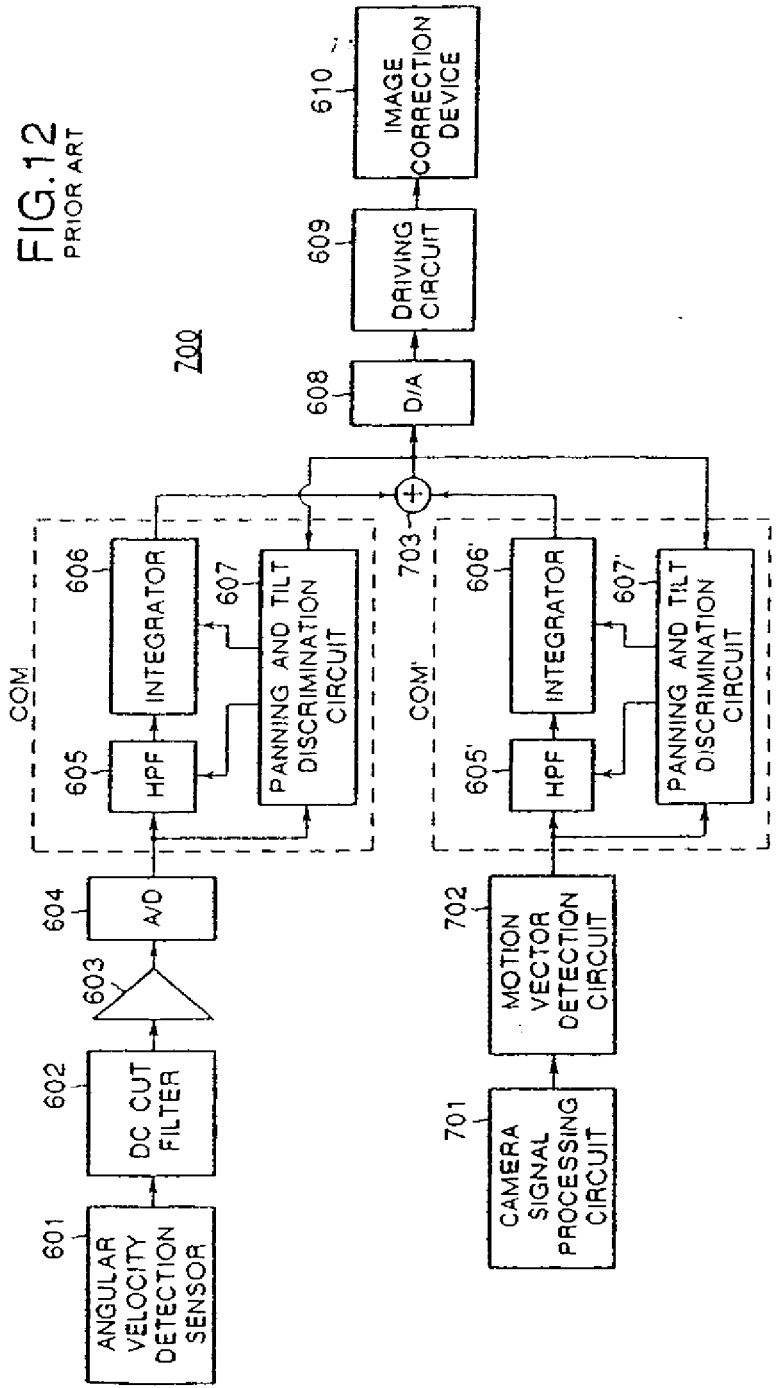

What is claimed is:

1. A vibration correcting device comprising:
   first vibration correction amount output means for obtaining a vibration correction amount from the vibration amount of the device;
   second vibration correction amount output means for obtaining a vibration correction amount from the vibration amount of a picked-up image obtained by picking up an object image with image pickup means through an optical system;
   single correction means for correcting the vibration in the picked-up image, based on a combined output of said first and second vibration correction amount output means; and
   control means for respectively controlling the outputs of said first and second vibration correction amount output means, based on the outputs of said first and second vibration correction amount output means,
   wherein said control means limits each of the increases in the vibration correction amounts, output from said first and second vibration correction amount output means, and
   wherein said control means comprises comparison means for comparing the outputs of said first and second vibration correction amount output means, and varies the proportion of limitation on the increases in the vibration correction amounts, based on the result of comparison by said comparison means.

2. A vibration correcting device according to claim 1, wherein said single correction means optically corrects the vibration in said picked-up image.

3. A vibration correcting device according to claim 1, wherein said single correction means optically corrects the vibration in said picked-up image, utilizing a variable angle prism transmitting the object image to the image pickup means.

4. A vibration correcting device according to claim 1, wherein said single correction means optically corrects the vibration in the picked-up image, utilizing a movable lens group transmitting the object image to the image pickup means.

5. A vibration correcting device comprising:
   first vibration detection means for detecting the vibration amount of the device;
   first vibration correction amount output means for converting the vibration amount, detected by said first vibration detection means, into a vibration correction amount;
   second vibration detection means for detecting the vibration amount of a picked-up image obtained by picking up an object image with image pickup means through an optical system;

second vibration correction amount output means for converting the vibration amount, detected by said second vibration detection means, into a vibration correction amount;

single correction means for correcting the vibration in the picked-up image, based on a combined output of said first and second vibration correction amount output means; and control means for respectively controlling the outputs of said first and second vibration correction amount output means, based on the outputs of said first and second vibration correction amount output means, wherein said control means limits each of the increases in the vibration correction amounts, output from said first and second vibration correction amount output means, and wherein said control means comprises comparison means for comparing the outputs of said first and second vibration correction amount output means, and varies the proportion of limitation on the increases in the vibration correction amounts, based on the result of comparison by said comparison means.

6. A vibration correcting device according to claim 5, wherein said single correction means optically corrects the vibration in said picked-up image.

7. A vibration correcting device according to claim 5, wherein said single correction means optically corrects the vibration in said picked-up image, utilizing a variable angle prism transmitting the object image to the image pickup means.

8. A vibration correcting device according to claim 5, wherein said single correction means optically corrects the vibration in the picked-up image, utilizing a movable lens group transmitting the object image to the image pickup means.

9. An image pickup apparatus provided with the vibration correcting device according to any one of claims 1 to 8.

10. An image pickup system provided with the image pickup apparatus according to claim 9.

11. An image pickup apparatus provided with a camera unit, a lens unit detachably mountable on said camera unit, and transfer control means for effecting information transfer between said camera unit and said lens unit, wherein said camera unit comprises second vibration correction amount output means for obtaining a vibration correction amount from the vibration amount of a picked-up image obtained by picking up an object image with image pickup means through an optical system, wherein said lens unit comprises first vibration correction amount output means for obtaining a vibration correction amount from the vibration amount of the apparatus, single correction means for correcting the vibration in the picked-up image based on a combined output of said first and second vibration correction amount output means, and control means for respectively limiting the outputs of said first and second vibration correction amount output means, based on the outputs of said first and second vibration correction amount output means, wherein said transfer control means executes transfer of the vibration correction amounts output from said first and second vibration correction amount output means and control information at said control means, at a predetermined timing, wherein said control means limits each of increases in the vibration correction amounts output from said first and second vibration correction amount output means, and wherein said control means comprises comparison means for comparing the outputs of said first and second vibration correction amount output means, and varies the proportion of limitation on the increases of the vibration correction amounts, based on the result of comparison by said comparison means.

12. A vibration correcting device according to claim 11, wherein said single correction means optically corrects the vibration in the picked-up image.

13. A vibration correcting device according to claim 11, wherein said single correction means optically corrects the vibration in the picked-up image, utilizing a variable angle prism transmitting the object image to the image pickup means.

14. A vibration correcting device according to claim 11, wherein said single correction means optically corrects the vibration in the picked-up image, utilizing a movable lens group transmitting the object image to the image pickup means.

15. An image pickup system provided with the vibration correcting device according to any one of claims 1 to 8 or the image pickup apparatus according to any one of claims 11 to 14.

16. A camera unit which comprises being employed in the image pickup apparatus according to claim 11.

17. A lens unit which comprises being employed in the image pickup apparatus according to claim 11.

* * * * *

UNITED STATES PATENT AND TRADEMARK OFFICE
CERTIFICATE OF CORRECTION

PATENT NO. : 6,734,902 B1
DATED : May 11, 2004
INVENTOR(S) : Hideo Kawahara

It is certified that error appears in the above-identified patent and that said Letters Patent is hereby corrected as shown below:

Drawings,
FIG. 3, 4, 11 and 12, insert the attached:

Column 2,
Line 32, "example" should read -- example, --.

Column 14,
Line 26, the left margin should be closed up.

Column 15,
Line 25, "so-called" should read -- a so-called --.

Column 20,
Lines 28, 31 and 36, "A vibration correcting device" should read -- An image pickup apparatus --.

Signed and Sealed this

Seventh Day of September, 2004

JON W. DUDAS
*Director of the United States Patent and Trademark Office*